Oct. 8, 1935.    G. B. WHITNEY    2,016,917

FAN COOLED DYNAMO ELECTRIC MACHINE

Filed Jan. 30, 1934

Inventor:
George B. Whitney,
by Harry E. Dunham
His Attorney

Patented Oct. 8, 1935

2,016,917

UNITED STATES PATENT OFFICE 2,016,917

FAN-COOLED DYNAMO-ELECTRIC MACHINE

George B. Whitney, Lynn, Mass., assignor to General Electric Company, a corporation of New York Application January 30, 1934, Serial No. 708,974

4 Claims. (Cl. 171—252)

My invention relates to totally-enclosed dynamo-electric machines of the type provided with an enclosing casing and cooled by air circulating over the casing.

An object of my invention is to provide an improved construction for mounting a shield which directs cooling air from a fan over the enclosing casing of a dynamo-electric machine of the above mentioned type.

Further objects and advantages of my invention will become apparent as the following description proceeds, and the features of novelty which characterize my invention will be pointed out with particularity in the claims annexed to and forming a part of this specification.

Figure 1:
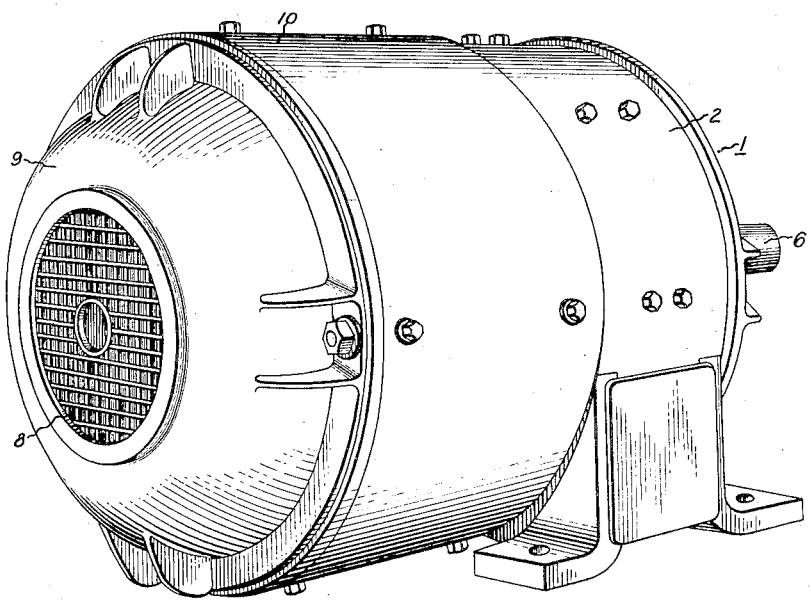
Figure 2:
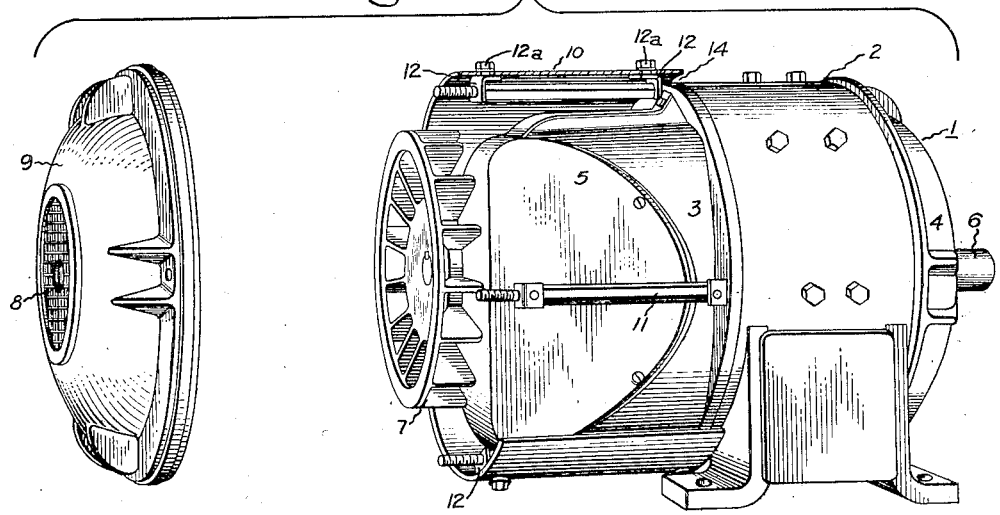

For a better understanding of my invention, reference may be had to the accompanying drawing in which Fig. 1 is a perspective view of a dynamo-electric machine embodying my invention, and Fig. 2 is an exploded view partly broken away of the dynamo-electric machine shown in Fig. 1.

I have shown my invention applied to a dynamo-electric machine which is totally enclosed by a casing 1 comprising a frame 2 and end bells 3 and 4 secured to either end of the frame 2. The end bell 3 is of smaller diameter than the frame 2 and has openings therein which are closed by removable covers 5. These covers may be removed for the purpose of inspecting the parts of the dynamo-electric machine within the casing. A shaft 6 secured to the rotatable member of the dynamo-electric machine projects through the enclosing casing at either end, and a fan 7 is secured to the projecting portion of the shaft adjacent the end bell 3. Heat is dissipated from the enclosed machine from the outer surface of the end bells 3 and 4 and the frame 2, and these surfaces are cooled by air circulating over the outer surface of these parts.

In accordance with my invention, air is directed from the fan 7 over the outer surfaces of the end bells 3 and 4 and the frame 2 to cool them. I do this by arranging an outer end shield 9 over the end of the fan 7 having a central air-intake opening 8 at the axis of the fan and providing a cylindrical shield 10 fitted on the end shield 9 and of slightly larger diameter than the frame 2 to provide an annular outlet opening 14. By this arrangement, air is drawn into the end shield 9 through the opening 8 and is discharged outwardly into the inside of the cylindrical end shield 10, so that it circulates over the outer surface of the end bell 3, through the opening 14, over the outer surface of the frame 2, and the outer surface of the end bell 4 so as to dissipate heat from the machine.

The end shield 9 is secured to the frame 2 by studs 11 extending axially of the machine. The ends of these studs 11 are provided with reduced threaded portions forming shoulders, the reduced portions at one end being threaded into the frame 2 and extending through the end bell 3 so as to secure the same to the frame. The cylindrical shield 10 is attached to the studs 11 by angle brackets 12 to which it is bolted at each end at 12a, the angle brackets being clamped between the end bell 3 and the end shield 9 against the shoulders on the studs 11. The portions of the angle brackets 12a project radially beyond the casing 1. By mounting the shields for directing air from the fan over the casing which encloses the motor on studs attached to the outside of the casing, it is possible to apply this type of cooling to existing motors without modifying the construction of the motor.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States is:

1. A dynamo-electric machine provided with an enclosing casing including a frame and an end bell and having a shaft extending through said end bell, a fan mounted on the extended portion of said shaft, studs secured to said casing and projecting axially therefrom, said studs being provided with shoulders adjacent the outer ends thereof, a series of supporting members carried by said studs projecting radially outward beyond said casing, and means for directing air from said fan over said enclosing casing, said means including a separable cylindrical sheet metal shield surrounding said end bell and secured to the radially projecting members on said studs and an end shield closing the outer end of said cylindrical shield and supported on the ends of said studs in engagement with said shoulders.

2. A dynamo-electric machine provided with an enclosing casing including a frame and an end bell and having a shaft extending through said end bell, a fan mounted on the extended portion of said shaft, studs secured to said casing and projecting axially therefrom, angle brackets secured to said studs and having portions projecting radially outward beyond said casing, and means for directing air from said fan over said enclosing casing, said means including a separable cylindrical sheet metal shield surrounding said end bell and secured to said angle brackets on said studs and an end shield closing the outer end of said cylindrical shield and being supported on the ends of said studs.

3. A dynamo-electric machine provided with an enclosing casing including a frame and an end bell and having a shaft extending through said end bell, a fan mounted on the extended portion of said shaft, studs secured to said casing and projecting axially therefrom, said studs being provided with shoulders adjacent the outer ends thereof, and means for directing air from said fan over said enclosing casing, said means including a separable cylindrical sheet metal shield surrounding said end bell and supported on the intermediate portion of said studs and an end shield closing the outer end of said cylindrical casing and supported on the outer ends of said studs in engagement with said shoulders.

4. A dynamo-electric machine provided with an enclosing casing including a frame and an end bell and having a shaft extending through said end bell, a fan mounted on the extended portion of said shaft, studs secured to said casing and projecting axially therefrom, said studs being provided with shoulders adjacent the outer ends thereof, brackets secured to said studs and having portions projecting radially outward beyond said casing, and means for directing air from said fan over said enclosing casing, said means including a separable cylindrical sheet metal shield surrounding said end bell and secured to said brackets and an end shield closing the outer end of said cylindrical shield and supported on the ends of said studs in engagement with said shoulders.

GEORGE B. WHITNEY.